United States Patent
Tsai et al.

(10) Patent No.: US 11,591,067 B2
(45) Date of Patent: Feb. 28, 2023

(54) ROTATING DOUBLE TRAPPED ROLLER AUXILIARY TRACK MECHANISM

(71) Applicant: The Boeing Company, Chicago, IL (US)

(72) Inventors: Kevin R. Tsai, Seattle, WA (US); John Thomas B. Homrich, Seattle, WA (US)

(73) Assignee: The Boeing Company, Chicago, IL (US)

(*) Notice: Subject to any disclaimer, the term of this patent is extended or adjusted under 35 U.S.C. 154(b) by 350 days.

(21) Appl. No.: 16/595,448

(22) Filed: Oct. 7, 2019

(65) Prior Publication Data

US 2021/0101671 A1 Apr. 8, 2021

(51) Int. Cl.
*B64C 9/02* (2006.01)
*B64C 9/18* (2006.01)

(52) U.S. Cl.
CPC . *B64C 9/02* (2013.01); *B64C 9/18* (2013.01)

(58) Field of Classification Search
CPC .... B64C 9/02; B64C 9/18; B64C 9/16; B64C 9/20
See application file for complete search history.

(56) References Cited

U.S. PATENT DOCUMENTS

| | | | | |
|---|---|---|---|---|
| 4,471,928 A | * | 9/1984 | Cole | B64C 9/00 244/215 |
| 4,725,026 A | * | 2/1988 | Krafka | B64C 9/16 244/213 |
| 2008/0040886 A1 | * | 2/2008 | Arnold | B64C 9/16 16/275 |
| 2010/0187367 A1 | * | 7/2010 | Dahl | F16C 23/082 244/213 |

FOREIGN PATENT DOCUMENTS

GB 2530326 A * 3/2016 ............... B64C 9/16

* cited by examiner

*Primary Examiner* — Brady W Frazier
*Assistant Examiner* — Shanna Danielle Glover
(74) *Attorney, Agent, or Firm* — Felix L. Fischer

(57) ABSTRACT

A flap support mechanism includes a track rotatably connected to an aft fitting of a wing. A forward roller and an aft roller extend laterally from a flap structure, the forward roller and aft roller constrained in a slot in the track. The slot has a profile configured to induce both translation and rotation in the flap, in concert with rotation of the track about the aft fitting, thereby passively mirroring motion of the flap induced by an actuator driven primary main flap support.

20 Claims, 12 Drawing Sheets

ROTATING DOUBLE TRAPPED ROLLER AUXILIARY TRACK MECHANISM

BACKGROUND INFORMATION

Field

This disclosure relates generally to the field of aircraft flap systems and, more particularly to a flap deployment system having an auxiliary support with a track rotatably supported by a trailing wing structure and engaging one or more rollers secured to a flap structure.

Background

Aircraft employ flaps which deploy to increase camber and chord of the wings for enhanced aerodynamic efficiency in take-off and landing. In modern flap configurations, one or more auxiliary flap supports or deflection control tracks may be used to balance loads or prevent excessive flap deflection under a given load. Typically, main flap supports carry primary loads and provide actuation motion. Auxiliary flap supports follow the actuation motion but can still carry load while providing spanwise deflection control and secondary load paths in the event of an inadvertent separation in a primary load path.

SUMMARY

Exemplary implementations of a flap support mechanism includes a track rotatably connected to an aft fitting of a wing. A forward roller and an aft roller extend laterally from a flap structure, the forward roller and aft roller constrained in a slot in the track. The slot has a profile configured to induce both translation and rotation in the flap, in concert with rotation of the track about the aft fitting, thereby allowing an outboard edge or an inboard edge of the flap to passively mirror motion of the flap induced by an actuator driven primary main flap support.

The exemplary implementations provide a method for flap deployment by constraining a forward roller and an aft roller laterally extending from a flap rib in a slot in a track rotatably connected to an aft fitting of a wing. The flap is deployed from a stowed position, translating the flap relative to the track and rotating the track relative to the aft fitting. The forward roller and aft roller move aft in the slot controlling deflection of the flap allowing an outboard edge or an inboard edge of the flap to passively mirror extending motion of the flap induced by an actuator driven primary main flap support.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The implementations described herein provide an auxiliary flap support employing a track rotatably attached with a pivoting joint to an aft fitting extending from the rear wing spar. The track captures two rollers extending laterally from a rib of the flap structure for positioning of the flap. The flap translates relative to the track during deployment and the track is substantially received within the flap loft line, i.e. the periphery of the skin at a rib or chord section, over the range of deployment. The implementation does not occupy space forward of an interface between the track and aft fitting proximate the flap which leaves room for systems runs in the wing structure forward of the pivoting joint. The track provides a compact configuration and does not require a fairing at the flap joint. Pivoting of the track enables drooping spoilers and high fowler motion and reduces weight through the double trapped roller arrangement. The auxiliary flap support is primarily load capable in the vertical direction (substantially perpendicular to a flight path of the aircraft) with just two rollers.

Figure 1A:
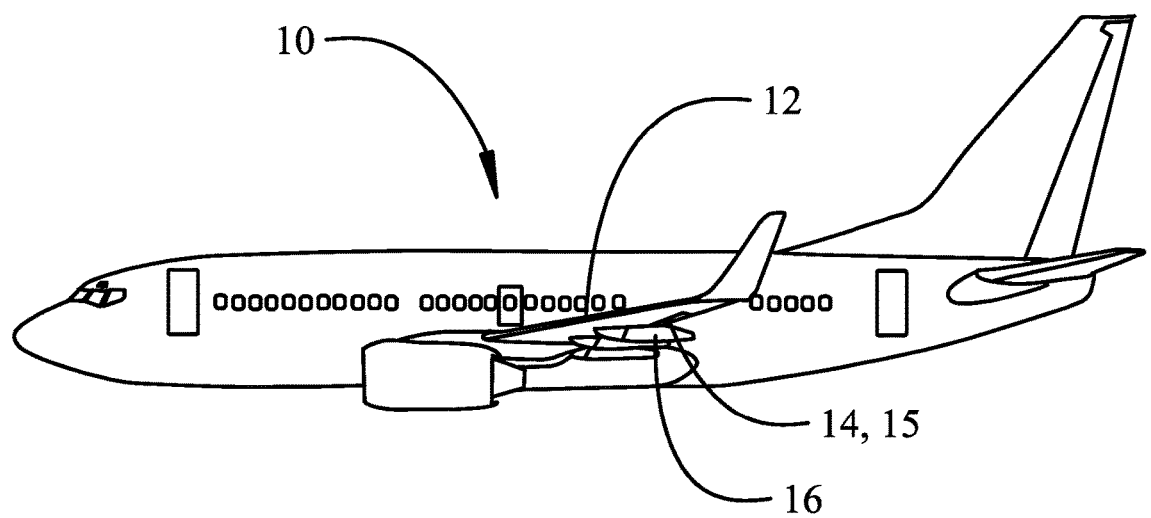
FIG. 1A is a representation of an aircraft in which the implementations disclosed herein may be employed.
Figure 1B:
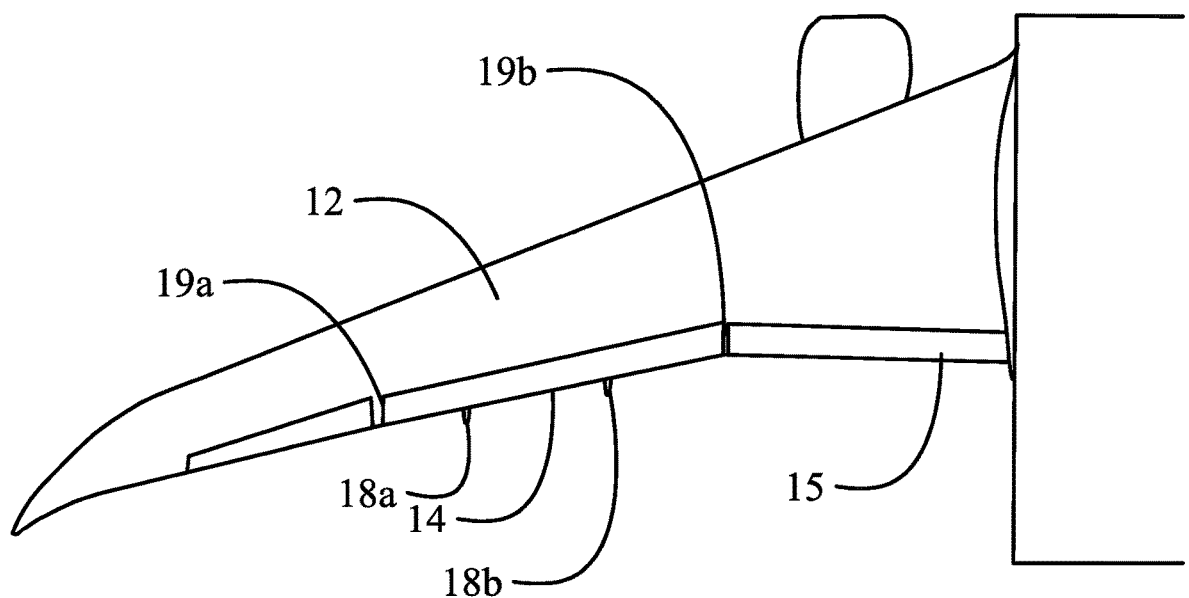
FIG. 1B is a top view of the wing and flaps of FIG. 1A.
Figure 1C:
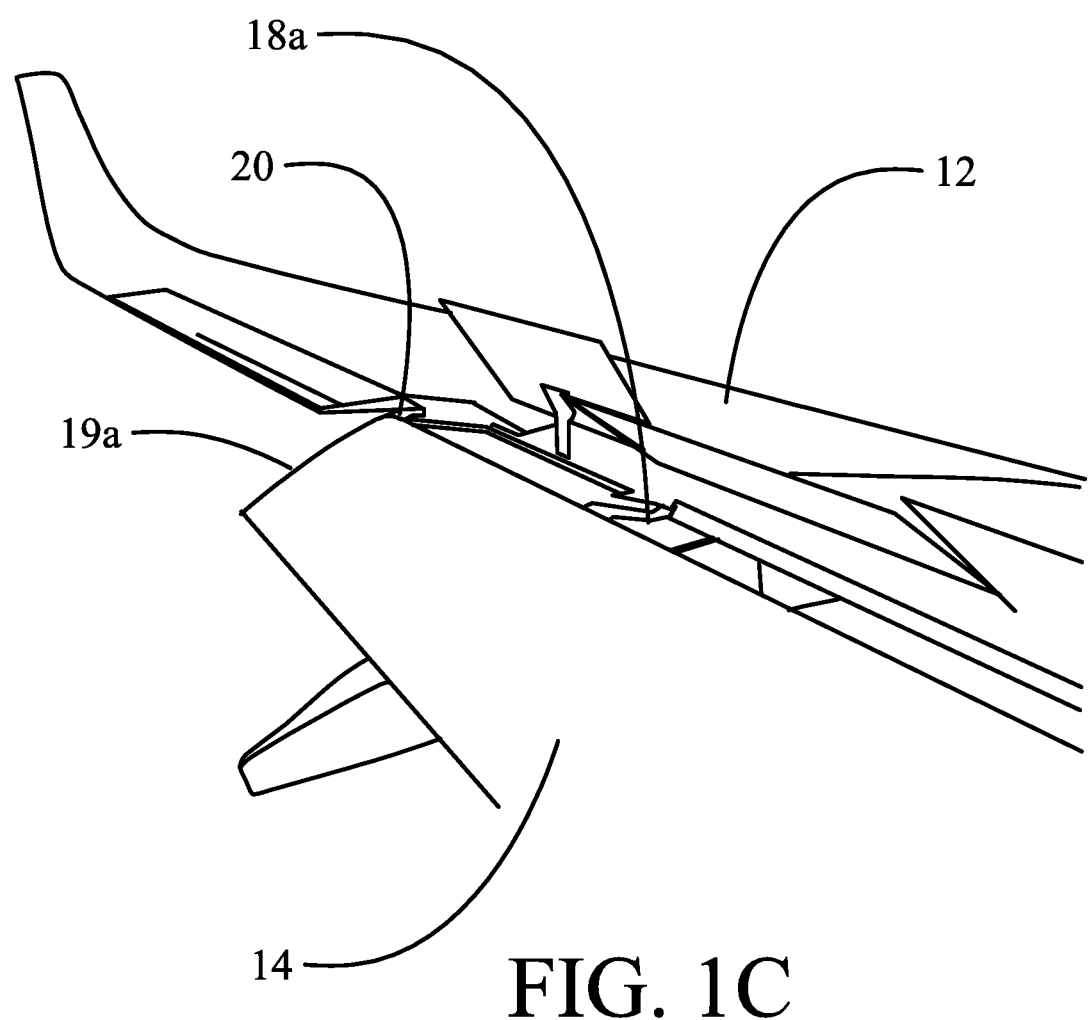
FIG. 1C is pictorial representation of the aircraft wing with the flaps and air brakes deployed.
Figure 1D:
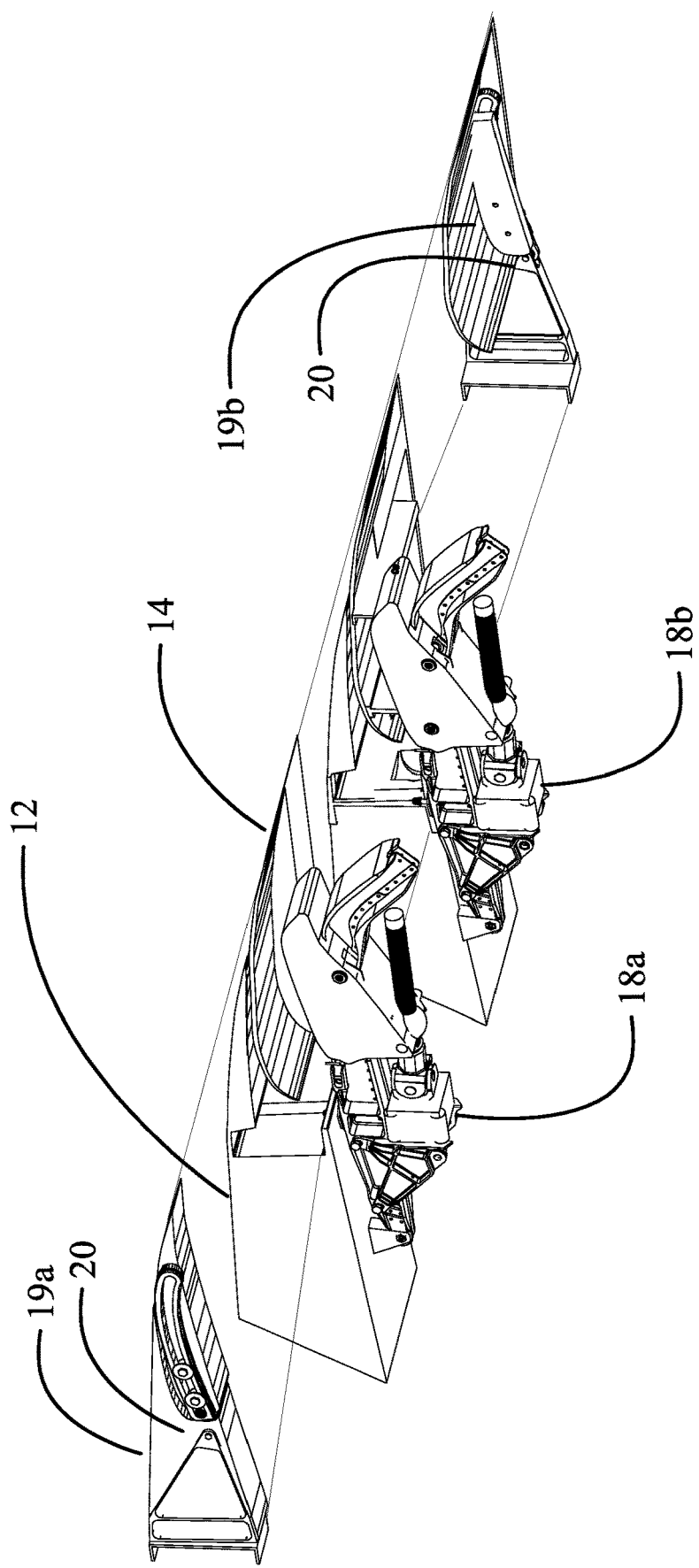
FIG. 1D is a lower front pictorial view of the outboard flap and supports.

Referring to the drawings, FIGS. 1A-1C depict an aircraft 10 having a wing 12 with an operating flap system, for the example shown, outboard flap 14 and inboard flap 15. The flaps 14, 15 are engaged to the wing 12 with multiple attachment supports, some of which may be partially housed within fairings 16. Extension of the flaps 14, 15 to enhance aerodynamic performance during takeoff and landing is accomplished with a flap deployment system that causes the flaps 14, 15 to rotate aft and downward relative to the wing 12. Example attachment supports for the outboard flap 14 are shown in FIG. 1D. While described herein with respect to outboard flap 14, the implementations are equally applicable to inboard flap 15. In the example configuration shown in the drawings, outboard flap 14 is supported from the wing 12 by an outboard primary support 18a, with an actuator driven mechanism for deployment of the flap and an inboard primary support 18b, also having an actuator driven mechanism assisting in deployment of the flap. Passively operating auxiliary supports 20 provide deflection control and balances the loads on the flap outboard and inboard of the two primary supports proximate the outboard edge 19a and inboard edge 19b of the outboard flap 14. In alternative implementations, one or more auxiliary supports may be employed between the outboard primary flap support and inboard primary flap support.

Figure 2:
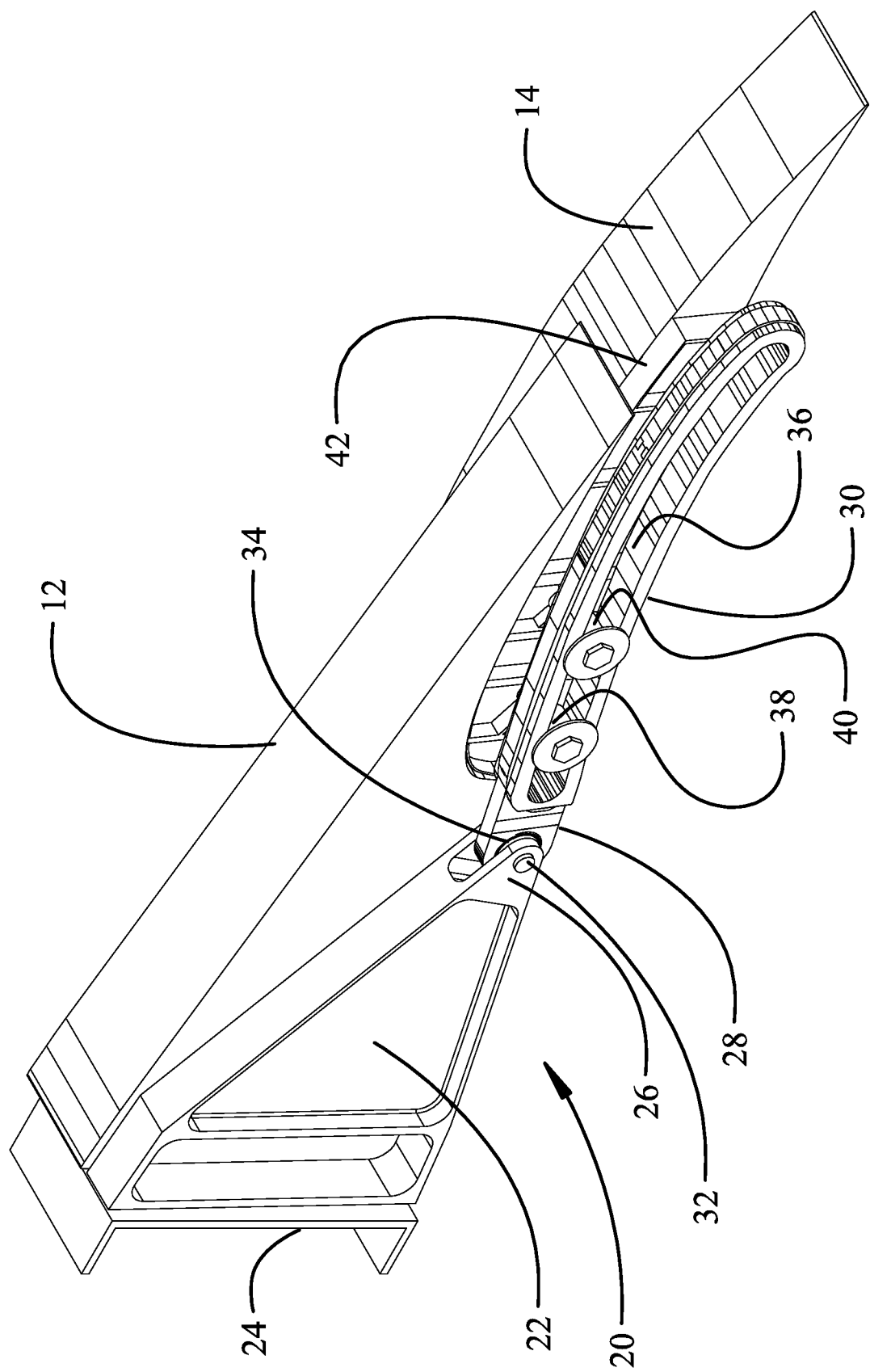
FIG. 2 is a rear pictorial view of the auxiliary support as attached to the wing and flap.
Figure 3:
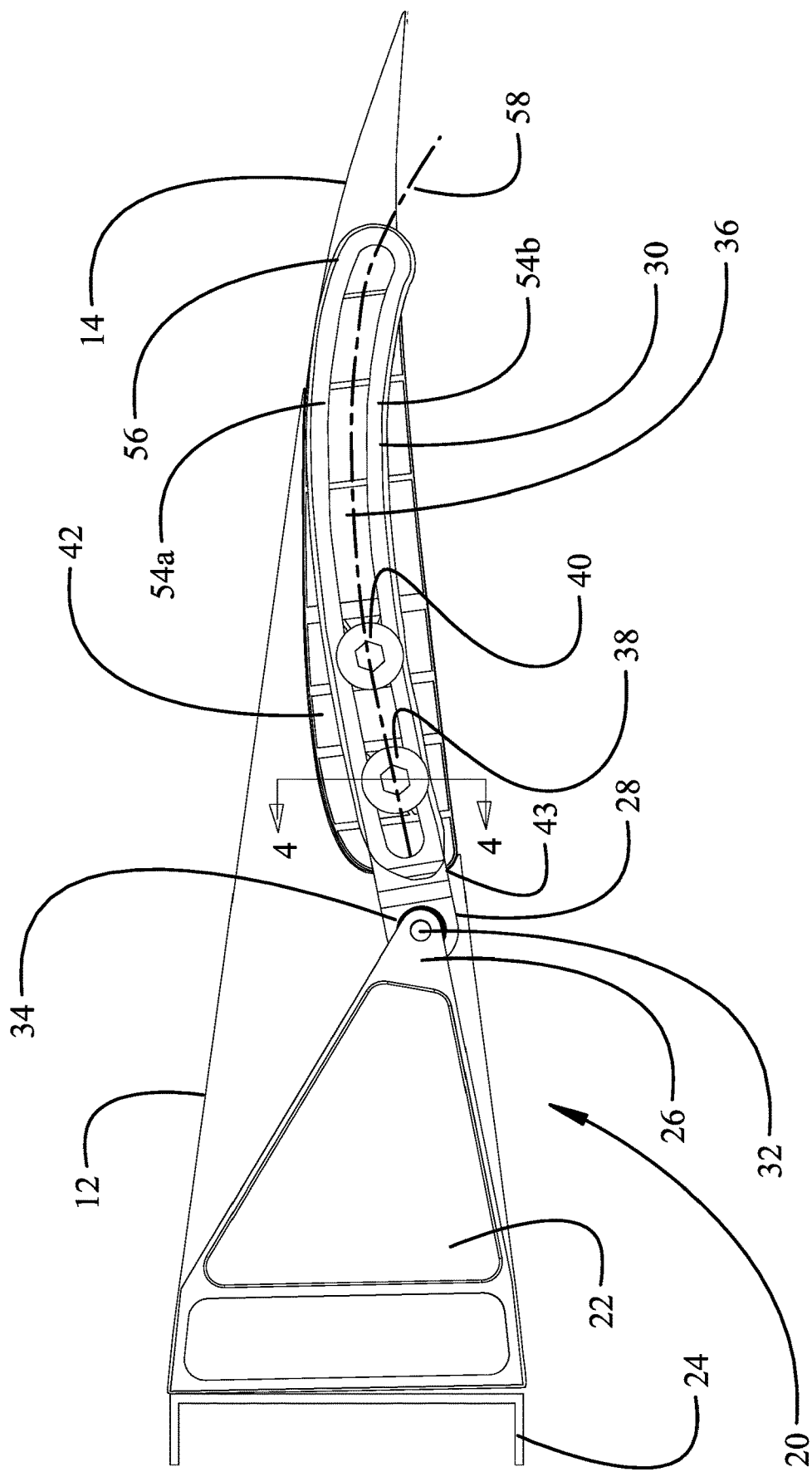
FIG. 3 is a side view of the auxiliary support as attached to the wing and flap.

FIGS. 2 and 3 show details of an implementation of a flap support mechanism such as the auxiliary support 20. An aft fitting 22 extends aft from a rear spar 24 within an aft portion of the wing 12. For the example implementation, a clevis 26 is present on the trailing end of the aft fitting 22. A forward lug 28 of a track 30 is rotatably engaged in the clevis 26 with a pivoting joint including a pivot pin 32 extending through a spherical bearing 34 in the forward lug 28. The track 30 incorporates a slot 36 which receives a forward roller 38 and an aft roller 40 extending laterally from a supporting structural member of the flap 14, rib 42 in the example implementation shown. The flap 14 translates relative to the track 30 with the forward and aft rollers 38, 40 and the track 30 remains within the loft line of the flap 14 over a range of deployment of the flap. Rib 42 may be a closeout rib at an outboard or inboard edge 19a, 19b of flap 14 or the track 30 may be received in an aperture 43 in a leading edge of the flap 14 as represented in FIG. 3.

Figure 4:
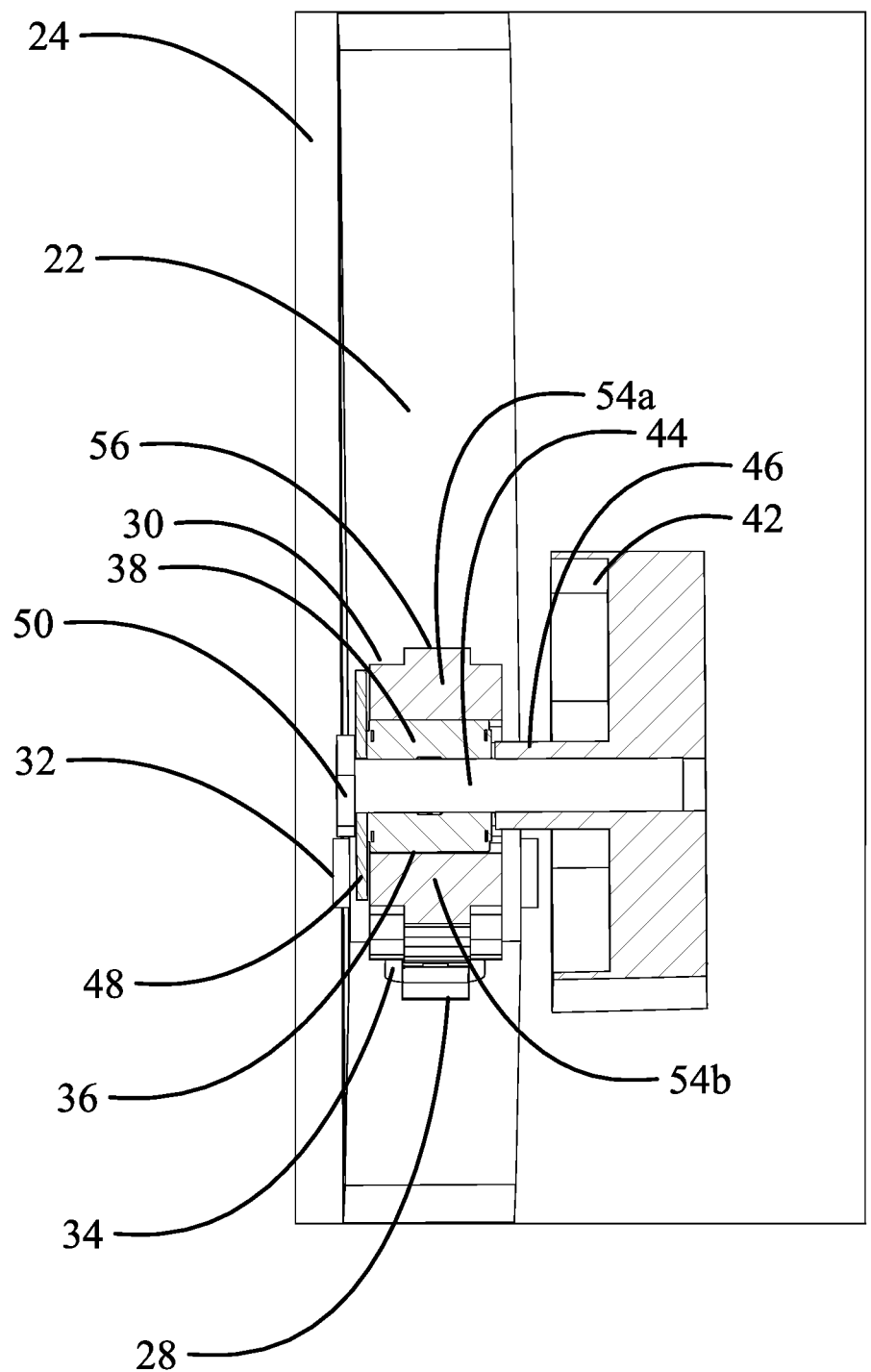
FIG. 4 is a rear section view through line 4-4 in FIG. 3 showing details of the track, rollers and supporting elements for the example implementation.
Figure 5:
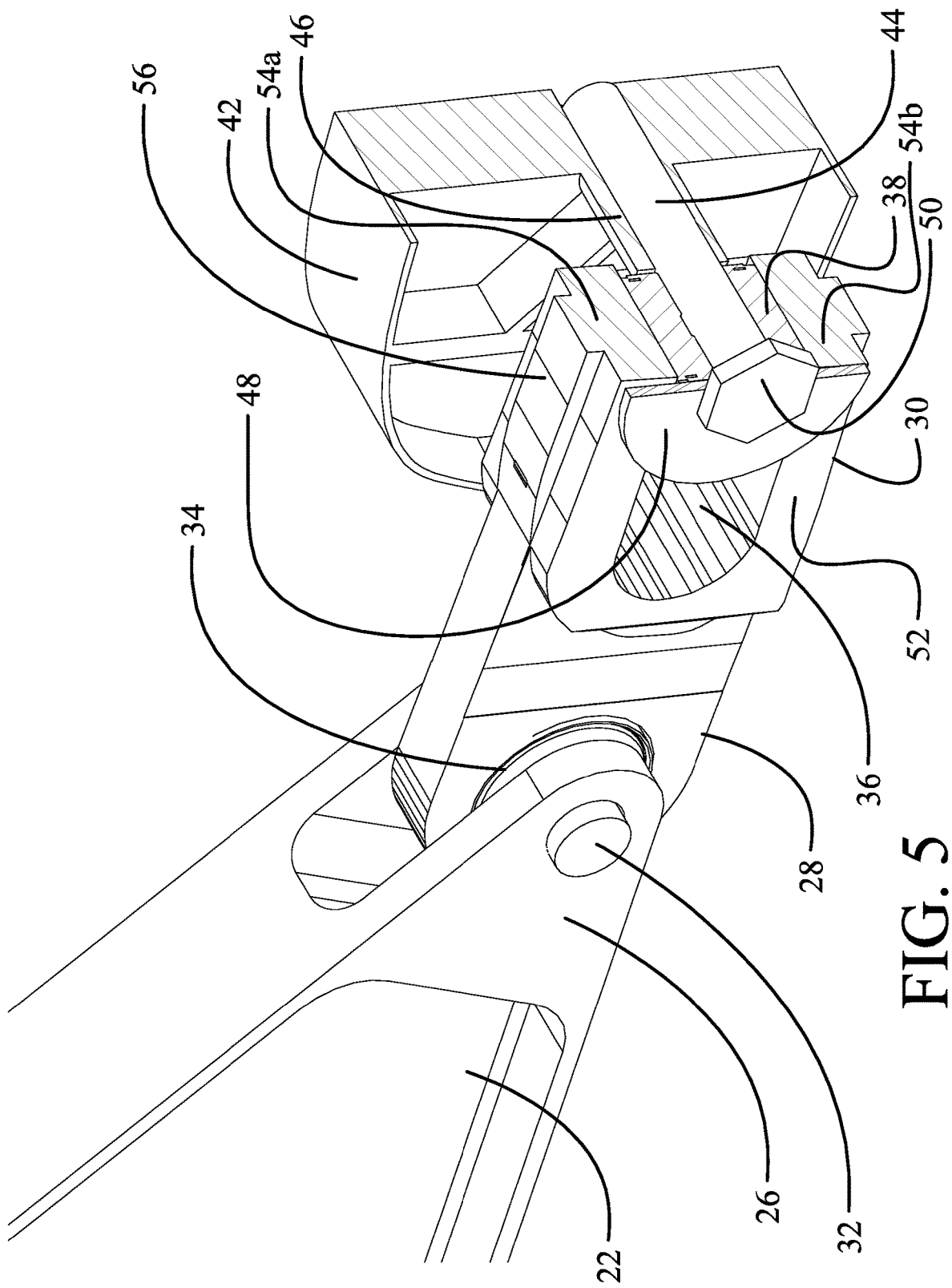
FIG. 5 is a detailed pictorial section view of the example implementation.

As seen in greater detail in FIGS. 4 and 5, the forward and aft rollers 38, 40 are each rotatable on a roller pin 44 which extends into the rib 42 through a standoff 46 configured to provide lateral inboard spacing of the forward and aft rollers 38, 40 from the rib 42 and other flap structure. A retention washer 48 secured by a fastener head 50 on each roller pin 44 is configured to constrain the respective forward or aft roller 38, 40 laterally outboard and extends over a vertically oriented face 52 on the track 30 to react lateral loads, i.e. perpendicular to the flight path and vertical direction, to prevent lateral disengagement of the forward and aft rollers 38, 40 from the track 30. The track 30 has upper and lower flanges Ma, 54b above and below the slot 36 configured to provide reaction of forces in the vertical direction on the forward and aft rollers 38, 40. A spine 56 extending from the forward lug 28 around the periphery of the track 30 is configured to provide limit flexing of the track 30. Spacing of the forward and aft rollers 38, 40 in the slot 36 provide a couple reacting in concert with the pivot pin 32 to control deflection. The outboard edge 19a or inboard edge 19b of the flap 14 is prevented from bending up or rotating forward. The track 30 controls the shape of the flap 14 throughout deployment preventing bend/twist from nominal shape which would otherwise distort the spoiler-flap gaps and other related aerodynamics. With two rollers, the track prevents twist of the flap 14. Present deflection control tracks employ one roller and, therefore, only react shear of the flap, not torsion. The compact configuration with the track 30 effectively retracting into the flap 14 allows for greater cove space forward of the flap for routing of hydraulics, wiring and other such systems.

The slot 36 in the track 30 has a curved profile 58 that the forward and aft rollers 38, 40 follow during deployment of the flap. The curved profile 58 is configured to induce both translation and rotation in the flap 14, in concert with rotation of the track 30 about pivot pin 32, to better follow the desired motion of the flap by mirroring motion of the flap induced by the actuator driven primary main flap supports. Another key feature is that part of the track inner profile is used by both rollers (at different points in the motion). Tailoring the inner track profile such that both rollers have approximately the same nominal motion (in the region of the track inner profile that they both pass over during operation).

Figure 6A:
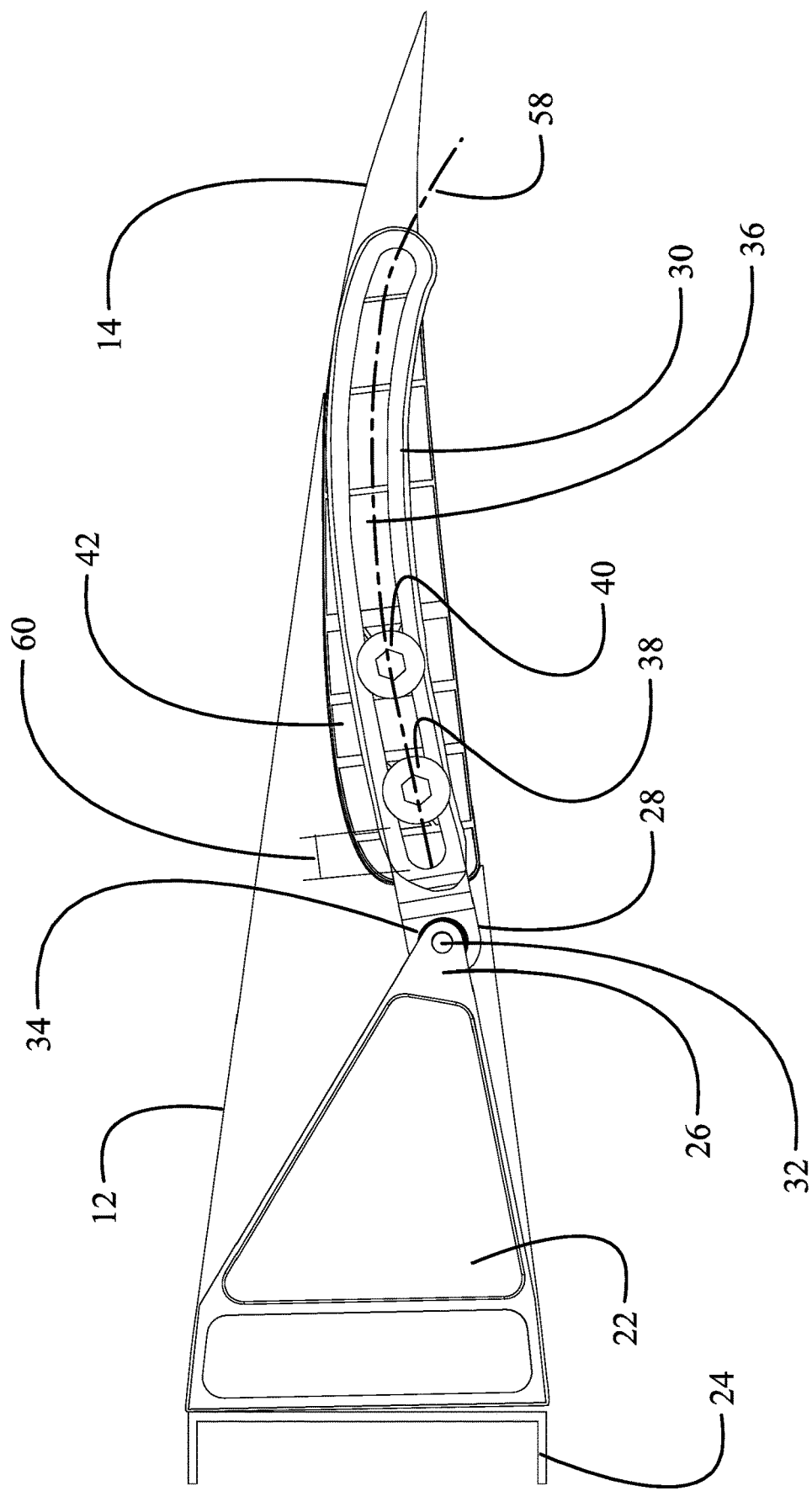
FIG. 6A-D are side views of the flap and auxiliary flap support sequentially deploying with the flap from a stowed position to a deployed position with rotation of the track and following of the track slot profile by the flap mounted rollers; and, FIG. 7 is a flow chart of a method for passive auxiliary support of a flap for deployment using the exemplary implementations.
Figure 6B:
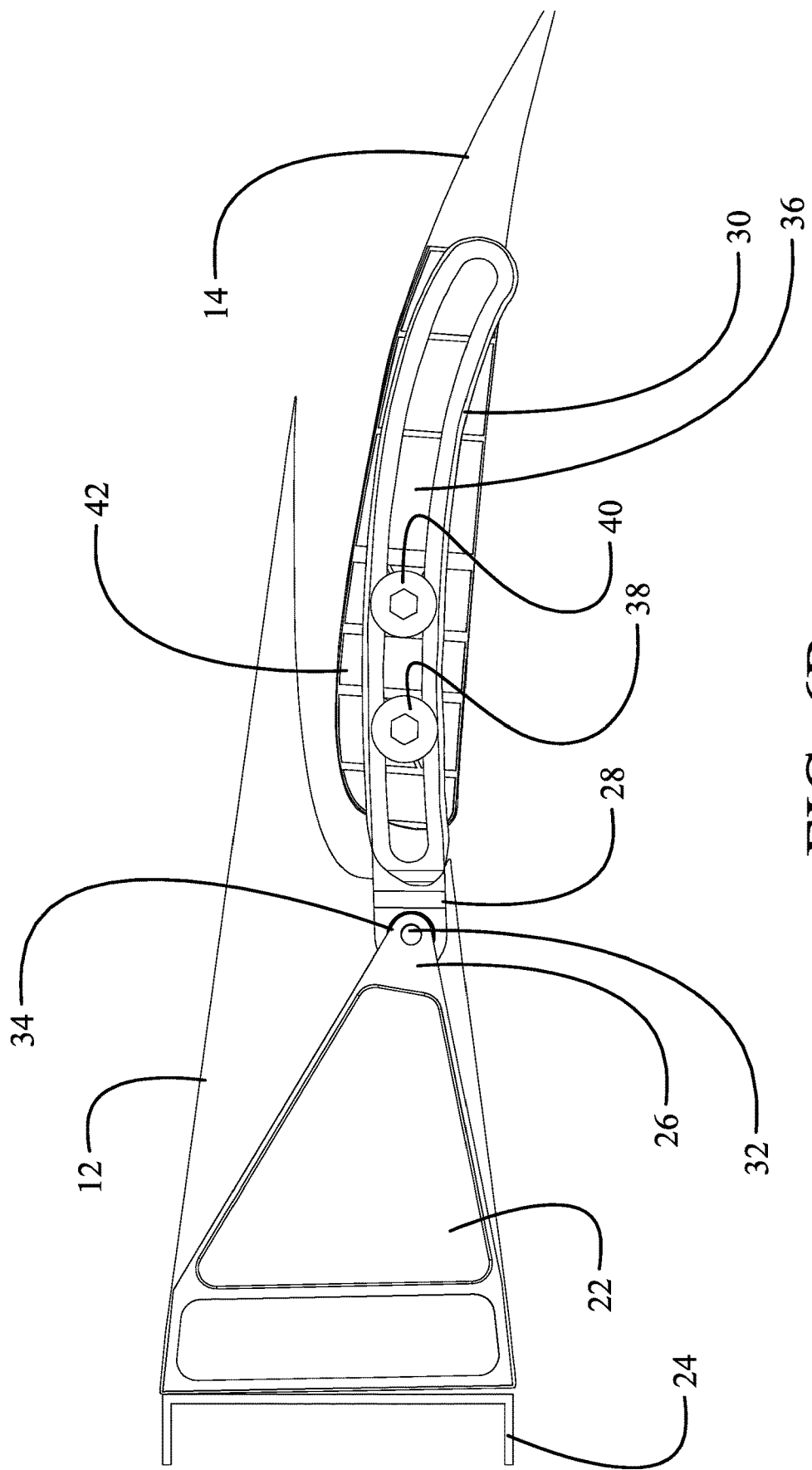
Figure 6C:
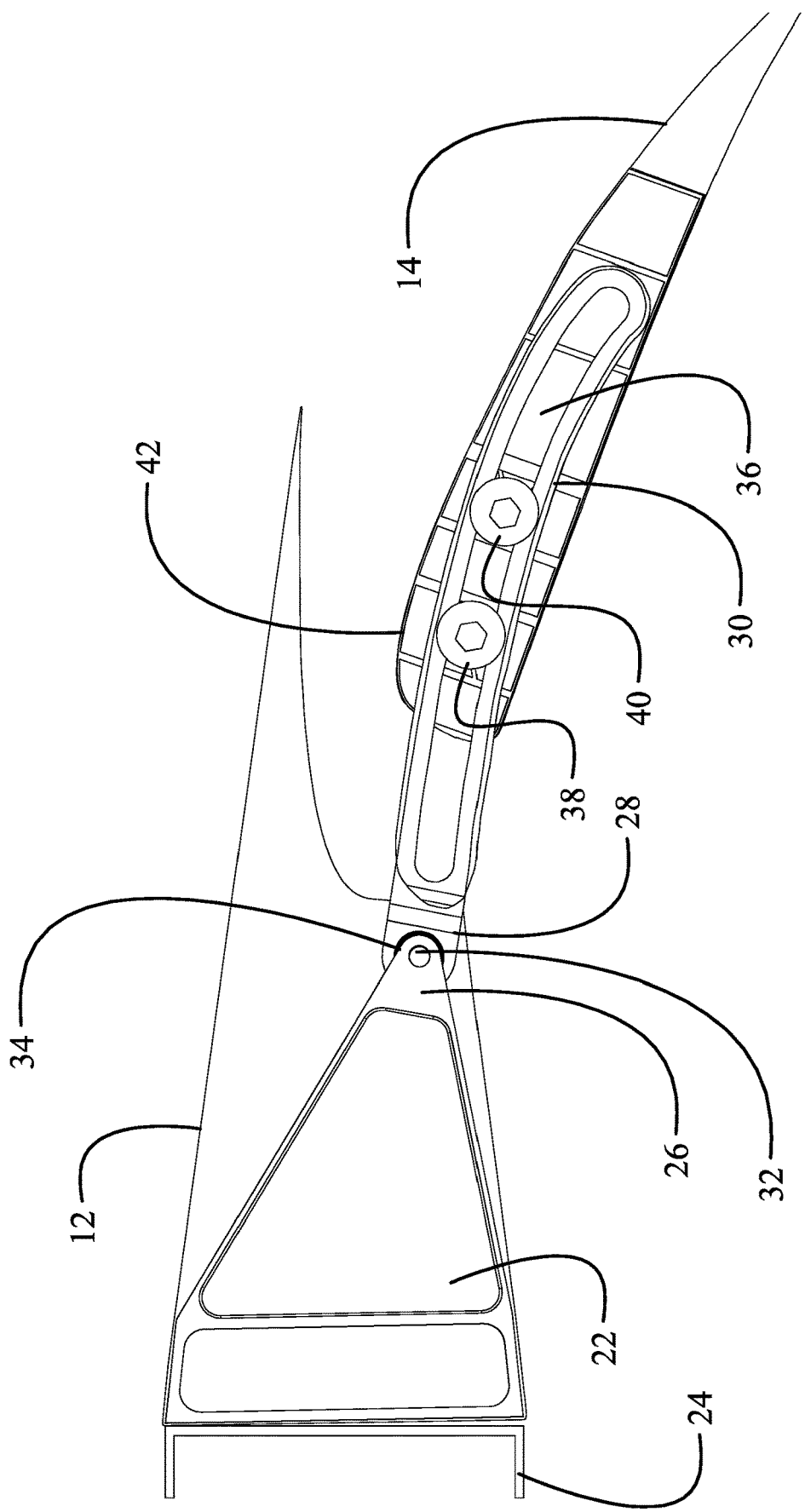
Figure 6D:
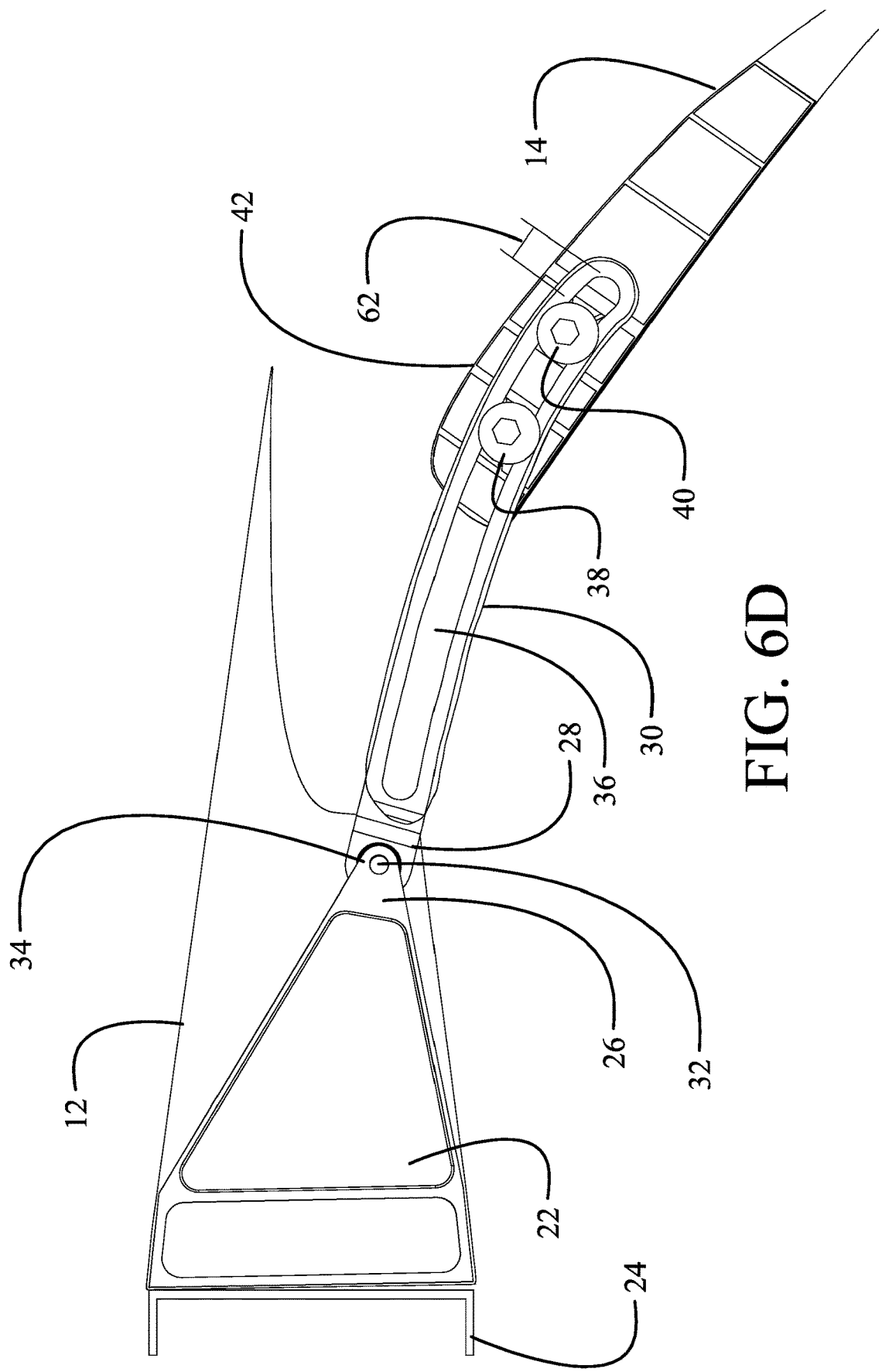

Operation of the example implementation for deployment of the flap 14 is shown in FIGS. 6A-6D. As seen in FIG. 6A with the flap 14 in the stowed position, the track 30 is positioned substantially within the loft lines of the flap 14 adjacent the rib 42. The forward and aft rollers 38, 40 are positioned with the forward roller 38 proximate a forward end of the slot 36. Length 60 of the slot 36 forward of the stowed position allows tolerance for overtravel capability. As the flap 14 is deployed to a first extended position shown in FIG. 6B, the forward and aft rollers 38, 40 move aft in the slot 36 and the track 30 rotates downward about pivot pin 32 and spherical bearing 34. With further extension of the flap 14 as shown in FIG. 6C, continuing rotation of the track 30 about pivot pin 32 and spherical bearing 34 provides enhanced droop as well as Fowler extension of the flap 14. The fully deployed position shown in FIG. 6D provides the desired maximum translated and rotated position with the forward and aft rollers 38, 40 with the aft roller proximate an aft end of the slot 36. Length 62 of the slot 36 aft of the deployed position again provides for tolerance in flap position that may be induced by the actuator driven primary main flap supports.

Figure 7:
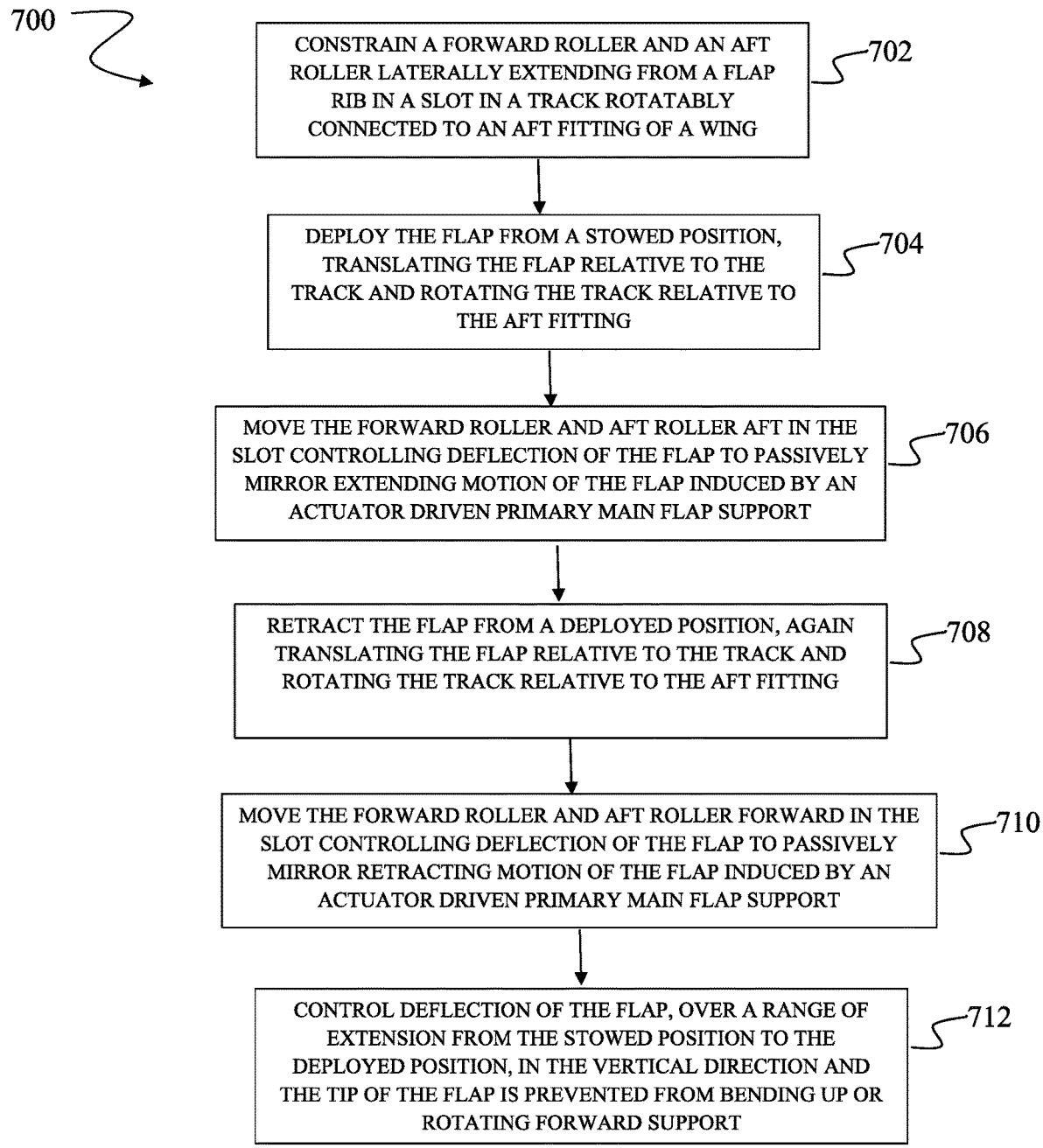

The implementations disclosed herein provide a method 700 for flap deployment with an auxiliary flap support track and auxiliary flap support fitting as shown in FIG. 7 by constraining a forward roller 38 and an aft roller 40 laterally extending from a flap rib 42 in a slot 36 in a track 30 rotatably connected to an aft fitting 22 of a wing12, step 702. The flap is deployed from a stowed position, translating the flap relative to the track and rotating the track relative to the aft fitting, step 704. The forward roller and aft roller move aft in the slot controlling deflection of the flap allowing the outboard edge or inboard edge of the flap to passively mirror extending motion of the flap induced by an actuator driven primary main flap support, step 706. The flap is retracted from a deployed position, again translating the flap relative to the track and rotating the track relative to the aft fitting, step 708. The forward roller and aft roller move forward in the slot controlling deflection of the flap allowing the outboard edge or inboard edge of the flap to passively mirror retracting motion of the flap induced by an actuator driven primary main flap support, step 710. Deflection of the flap, over a range of extension from the stowed position to the deployed position, is controlled in the vertical direction and the outboard edge or inboard edge of the flap is prevented from bending up or rotating forward, step 712, by the track 30 and forward and aft rollers 38, 40 with retention washers 48 secured by a fastener head 50 on each roller pin 44 configured to constrain the respective forward or aft roller 38, 40 laterally outboard and extends over a vertically oriented face 52 on the track 30. Overtravel of the flap in the stowed or deployed position is accommodated with forward and aft tolerance length 60, 62 in the slot 36.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. The term "substantially" as used within the specification and claims means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide. As used herein the terms "outboard" and "inboard" and "upper" and "lower" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A flap support mechanism for a passive auxiliary support comprising:
    a flap actuated for deployment by one or more actuators in a primary main flap support;
    a track rotatably connected proximate an outboard edge or an inboard edge of the flap with a pivoting joint to an aft fitting of a wing; and
    a forward roller and an aft roller extending from a flap structure in the outboard edge or the inboard edge of the flap, said forward roller and said aft roller constrained in a slot in the track, said slot having a profile configured to passively induce droop, translation and rotation in the flap with respect to the pivoting joint, concurrently with rotation of the track about the pivoting joint, thereby allowing the outboard edge or the inboard edge of the flap to passively mirror motion of the flap induced by the actuator driven primary main flap support.

2. The flap support mechanism of claim 1 wherein the track has a forward lug and further comprising:
    a clevis on a trailing end of the aft fitting;
    a spherical bearing in the forward lug; and
    a pivot pin extending through the clevis and spherical bearing thereby rotatably engaging the forward lug to the aft fitting.

3. The flap support mechanism of claim 2 wherein the flap structure is a rib.

4. The flap support mechanism of claim 3 wherein the rib is a closeout rib.

5. The flap support mechanism of claim 3 further comprising:
    a first roller pin received through the forward roller; and
    a second roller pin received through the aft roller, said first and second roller pins extending into the rib, a first standoff and a second standoff configured to provide lateral inboard spacing of the forward and aft rollers from the rib.

6. The flap support mechanism of claim 5 wherein the first and second roller pins each have a head and further comprising first and second retention washers secured by the head on each of the first and second roller pins and configured to constrain the forward and aft roller laterally outboard.

7. The flap support mechanism of claim 6 wherein the first and second retention washers extend over a vertically oriented face on the track to prevent lateral disengagement of the forward and aft rollers from the track.

8. The flap support mechanism of claim 7 wherein the track has upper and lower flanges above and below the slot, said upper and lower flanges configured to provide a reaction of forces on the forward and aft rollers.

9. The flap support mechanism of claim 8 further comprising a spine extending from the forward lug around a periphery of the track, said spine configured to limit flexing of the track.

10. The flap support mechanism of claim 1 wherein the aft fitting is connected to a rear spar of the wing.

11. An aircraft having a flap system comprising:
    a wing having a rear spar;
    a flap supported from the wing by at least one primary support with an actuator driven mechanism for deployment of the flap; and
    a passive auxiliary support having
        an aft fitting connected to the rear spar;
        a track rotatably connected with a pivoting joint to the aft fitting, said track having a slot; and
        a forward roller and an aft roller extending from a flap rib proximate an inboard edge or an outboard edge of the flap, said forward roller and said aft roller constrained in the slot in the track, said slot having a profile configured to induce droop, translation and rotation in the flap with respect to the pivoting joint, concurrently with rotation of the track about the pivoting joint, thereby allowing the outboard edge or the inboard edge of the flap to passively mirror motion of the flap induced by the actuator driven mechanism of the at least one primary support.

12. The aircraft having an operating flap system of claim 11 further comprising:
    a first roller pin received through the forward roller; and
    a second roller pin received through the aft roller, said first and second roller pins extending into the flap rib through a first standoff and a second standoff, respectively configured to provide lateral inboard spacing of the forward and aft rollers from the flap rib.

13. The aircraft having an operating flap system of claim 12 wherein the first and second roller pins each have a head and further comprising first and second retention washers respectively secured by the head on each of the first and second roller pins and respectively configured to constrain the first and second rollers laterally outboard, wherein the first and second retention washers extend over a vertically oriented face on the track to react lateral loads to prevent a lateral disengagement of the forward and aft rollers from the track.

14. The aircraft having an operating flap system of claim 13 wherein the track has
    a forward lug;
    upper and lower flanges respectively above and below the slot, said upper and lower flanges configured to provide a vertical reaction of forces on the forward and aft rollers; and
    a spine extending from the forward lug around a periphery of the track, said spine configured to limit flexing of the track.

15. The aircraft having an operating flap system of claim 14 wherein with the flap in a stowed position, the track is positioned substantially within loft lines of the flap adjacent the flap rib and the forward and aft rollers are positioned with the forward roller proximate a forward end of the slot.

16. The aircraft having an operating flap system of claim 15 wherein with the flap in a deployed position, the forward and aft rollers are positioned with the aft roller proximate an aft end of the slot.

17. A method for deployment of a flap comprising:
    constraining a forward roller and an aft roller laterally extending from a flap rib proximate an outboard edge or an inboard edge of a flap in a slot in a track rotatably connected with a pivoting joint to an aft fitting of a passive auxiliary support in a wing;
    deploying the flap from a stowed position with an actuator driven mechanism in a primary support;
    translating the flap relative to the track and the pivoting joint; and
    concurrently rotating the track about the pivoting joint in concert with the translation of the flap,
    wherein said forward roller and said aft roller moving aft in the slot control deflection of the flap for droop, translation and rotation allowing an outboard edge or an inboard edge of the flap to passively mirror extending motion of the flap induced by the actuator driven primary main flap support.

18. The method of claim 17 further comprising retracting the flap from a deployed position, translating the flap relative to the track and rotating the track relative to the aft fitting, wherein said forward roller and said aft roller moves forward in the slot controlling deflection of the flap allowing the outboard edge or the inboard edge of the flap to passively mirror retracting motion of the flap induced by the actuator driven primary main flap support.

19. The method of claim 17 wherein deflection of the flap is controlled in the vertical direction, and wherein the forward and aft rollers are configured to prevent torsional force from being imposed upon the flap.

20. The method of claim 17 further comprising accommodating overtravel of the flap, in the stowed or deployed positions, with a forward and aft tolerance length in the slot.

\* \* \* \* \*